United States Patent Office 2,954,097
Patented Sept. 27, 1960

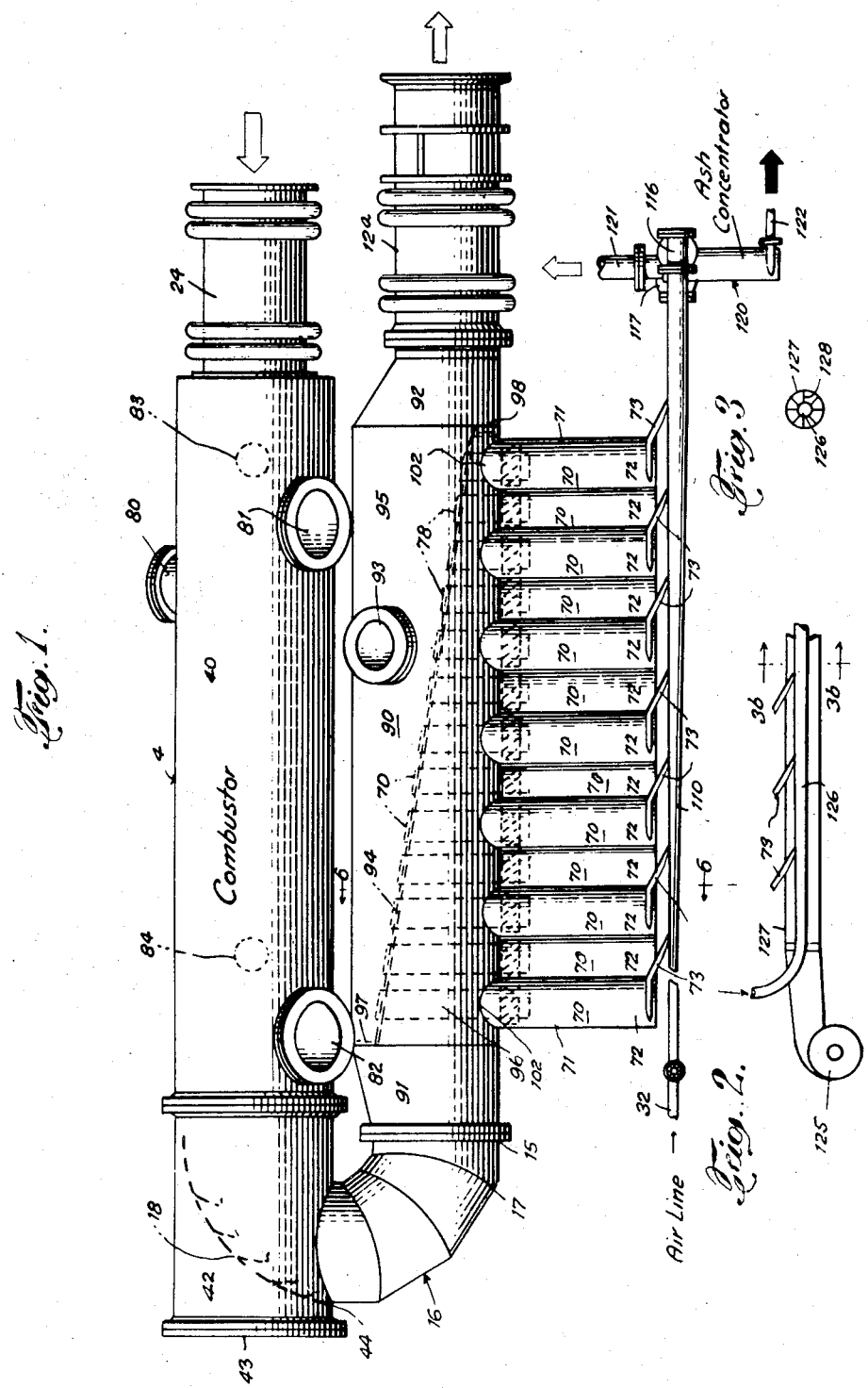

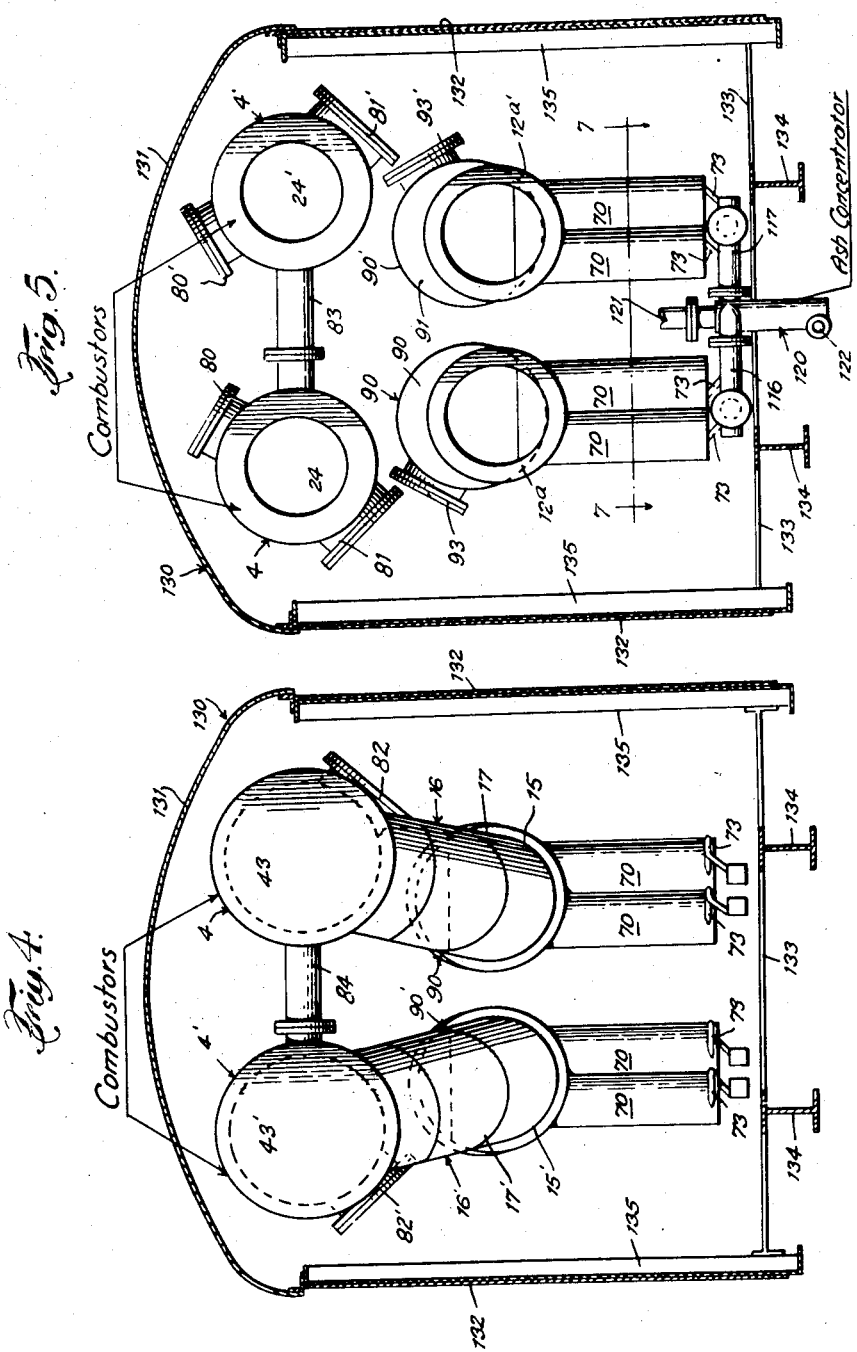

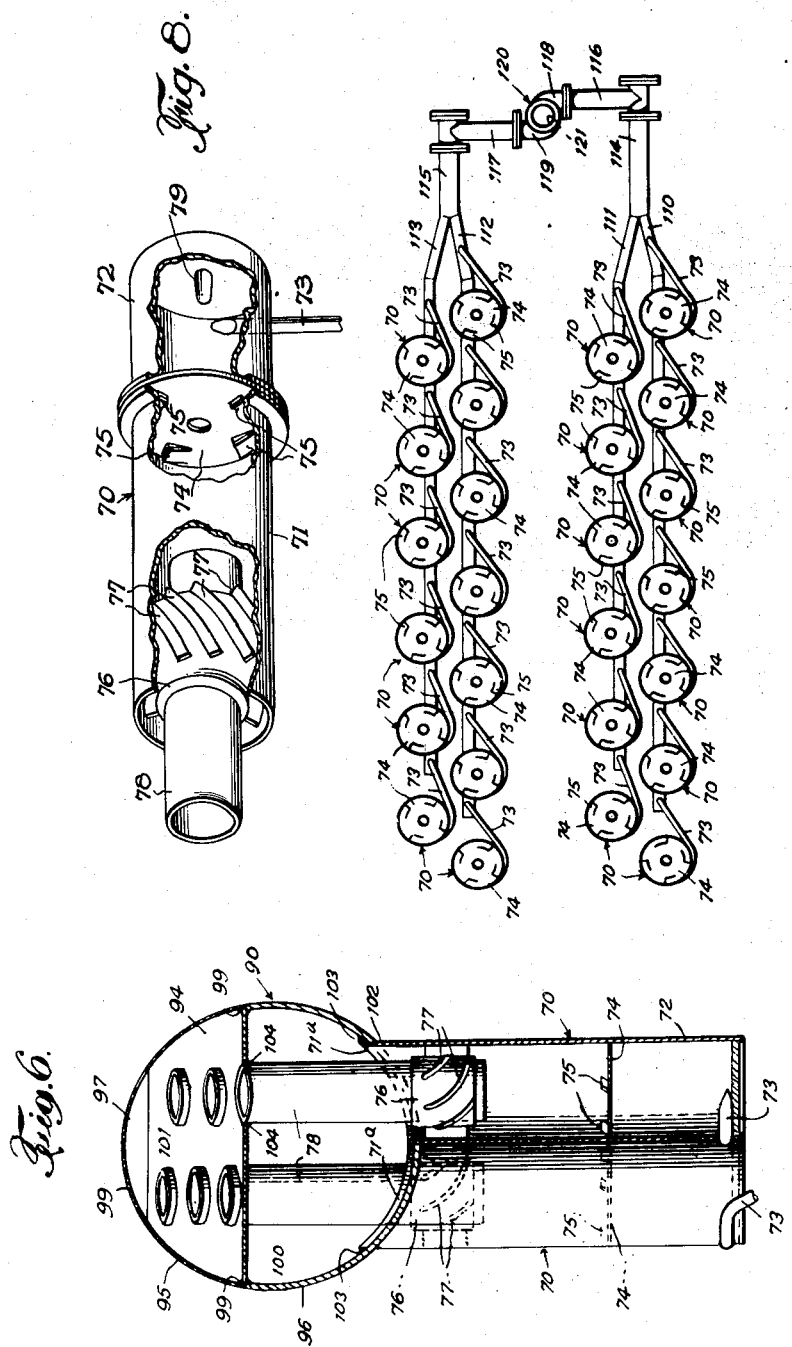

2,954,097

ASH SEPARATOR BATTERY FOR POWDERED COAL-BURNING PRESSURIZED COMBUSTION SYSTEMS

John I. Yellott, New York, N.Y., and Peter R. Broadley, Elizabeth, N.J., assignors to Bituminous Coal Research, Inc., Washington, D.C., a corporation of Delaware Original application Jan. 7, 1953, Ser. No. 330,077, now Patent No. 2,911,065, dated Nov. 3, 1959. Divided and this application Apr. 4, 1955, Ser. No. 499,122

3 Claims. (Cl. 183—80)

This application is a division of our application Serial No. 330,077, filed January 7, 1953, for Coal-Burning Gas Turbine Power Plants Incorporating Novel Self-Supporting and Pressure-Sustaining Vortical Whirl Separators Together With Improved Ash Quenching and Blowdown Means, now Patent No. 2,911,065, issued November 3, 1959.

The invention relates to special ash separating and disposal equipment operatively integrated with coal-burning pressurized combustion systems, the said equipment incorporating novel pressure-sustaining vortical whirl separators specially arranged in batteries having input and output plenum chambers in mutual heat-exchanging relation. Because of the reduced bulk of the component parts of the novel power plants herein, they are specially adapted for use as prime movers for locomotives.

In accordance with the present invention the ash separator plenum chamber casings are of uniform cross-section and incorporate juxtaposed, wedge-shaped input and output plenum chambers, of mutually inverse cross-section, in heat-exchanging relation. Vortical whirl separators of the type described and claimed in our prior application, Serial No. 257,702, filed November 23, 1951, for Vortical Whirl Separators and Method of Operation, are operatively coupled to the said casings. The barrels and adjacent discharge sections of the individual separators are secured on the outside of the input plenum chamber, and in fluid communication with the interior thereof, while the cleaned gas discharge tubes of the separators are hermetically disposed in the partitions or septa dividing the input and output plenum chambers, and deliver cleaned gas to the output or cleaned gas plenum chambers, whence it is delivered to gas turbines or other use devices, through suitable ducts.

By utilizing the special vortical whirl separators of our above-identified application, which are pressure-sustaining and self-supporting, it has been found that it is possible to eliminate the costly and unduly bulky pressure-sustaining tanks or vessels in which the vortical whirl separators have been housed, and to mount the novel pressure-sustaining and self-supporting vortical whirl separators exteriorly of the input plenum chambers of special motive fluid conduits, ducts, or casings. These novel motive fluid conduits connect a motive fluid source, such as a compressor and a combustor using residue-forming fuel dispersed in a current of combustive or primary air, with a use device, such as a gas turbine. The conduits, ducts, or casings, are divided, lengthwise (that is, in the direction of flow of the motive fluid) into a convergent, wedge-shaped dirty gas input plenum chamber, and an output or cleaned gas plenum chamber, the said plenum chambers being incorporated in casings having a common interior wall which serves as a support for the hermetically disposed, cleaned gas discharge tubes of the vortical whirl separators, which tubes discharge cleaned gas into the output plenum chamber. Tangential blowdown lines for separated ash are provided for the discharge sections of the vortical whirl separators, and manifolds conduct the collective separated ash blowdown streams to an ash concentrator comprised of a single, low capacity (volume) vortical whirl separator, from which the concentrated ash is conveyed to suitable storage means, while the final quantum of cleaned gas is returned to the system, or vented to the atmosphere, as the exigencies of the operation of any particular installation may require.

The downcomer ducts can be of various configurations, according to the particular installations in which they are to be incorporated, and are severally hermetically connected to the input plenum chambers of the novel ash separator batteries herein. Means are provided at the bases of the ducts or in fore chambers of the input plenum chambers, for receiving and withdrawing separated, quenched residues from the motive fluid, the fly ash contained in the fluid being separated therefrom in its passage through the battery of special vortical whirl separators forming an integral part of the ash separator system herein, and continuously removed from the system in a blowdown stream of motive fluid comprising up to 1.5 percent of the total throughput volume of the fluid.

It is, therefore, among the features of novelty and advantage of the present invention to provide improved combustion and ash separating equipment for pressurized, powdered coal-burning power plants generating pressurized hot motive fluid for expansion engines, such as gas turbines, and for space heating devices, and other uses.

Another feature of novelty and advantage of the present invention is the provision of motive fluid conduit or duct means, forming plenum chamber casings hermetically divided, in the direction of flow, into dirty gas input and cleaned gas output plenum chambers, in mutual heat-exchanging relation, and coupling the cleaned gas plenum chambers with use devices, such as gas turbines, the motive fluid being stripped of entrained solids by passage through special vortical whirl separators, mounted externally of the motive fluid duct means and severally coupling the said dirty gas input and cleaned gas output plenum chambers.

It is also a feature of novelty and advantage of the present invention to provide ash separating means for the turbine motive fluid, the separating means being comprised of batteries of vertically disposed, self-sustaining, heat-resistant and pressure-sustaining special reverse flow vortical whirl separators, incorporating blowdown lines for separated ash, and with or without light-weight heat-insulating casings therefor.

A special feature of novelty and advantage of the invention herein is the provision of ash-separating means comprised of batteries of self-sustaining, heat-resistant and pressure-sustaining special reverse flow vortical whirl separators subjoined to a duplex plenum chamber casing longitudinally divided to form rectilinear dirty gas input and cleaned gas output plenum chambers interconnected solely through the cleaned gas discharge tubes of the separators.

With these and other important features of novelty and advantage which may be incident to the improvements herein, the invention consists in the parts and combinations to be hereinafter set forth and claimed, with the understanding that the several necessary elements comprising the invention may be varied in construction, proportions and arrangements, without departing from the spirit and scope of the appended claims.

In order to make the invention more clearly understood, there is shown in the accompanying drawings means for carrying the same into practical effect, without limiting the improvements in their useful application to the particular constructions, which, for the purpose of explanation, have been made the subject of illustration.

In the drawings, like numerals refer to similar parts throughout the several views, of which Figure 1 is an elevational view of combustor and one unit of an associated ash removal system having juxtaposed dirty gas inlet and cleaned gas outlet plenum chambers in mutual heat-exchanging relation, and incorporating a subjoined battery of special vortical whirl separators, the individual separators forming pressure vessels provided with tangential blowdown lines for ash discharge, the blowdown lines incorporating flow restrictor means and spacedly discharging into a flaring blowdown manifold coupled to an concentrator, the manifold having a valved coolant air inlet;

Fig. 2 is a diagrammatic showing of an external tubular forced-air coolant means for the ash discharge manifold of Fig. 1;

Fig. 3 is a cross section taken on line 3b—3b of Fig. 2, and showing radial extended surface coolant fins and air ducts formed thereby with the external sheath tube and the manifold;

Fig. 4 is a transverse vertical section of the power car of a locomotive showing an end elevation, the discharge ends of a pair of combustion units being coupled to their ash separator units, as shown in Fig. 1;

Fig. 5 is a view similar to Fig. 4, showing the secondary air input ends of the combustors and the discharge output ends of the ash separator assemblies and the coupling of their ash blowdown systems to a common ash concentrator and blowdown unit;

Fig. 6 is a transverse section taken on line 6—6 of Fig. 1, showing the orientation of the depending reverse flow vortical whirl separator units of the ash separators, and the mutual heat-exchanging relation of the dirty gas input and cleaned gas output plenum chambers;

Fig. 7 is a horizontal cross-section, taken on line 7—7 of Fig. 5, showing a pair of separator batteries and their constituent separator tubes with individual blowdown lines, together with the ash discharge manifolds and terminal vortical whirl ash concentrator coupled thereto, and Fig. 8 is an elevational view, partly in broken section, of a novel reverse flow vortical whirl separator, showing the details of the barrel or primary separator chamber and the adjacent discharge chamber with its tangential blowdown line.

Turning now to Fig. 1, the specific details of the improved combustor and ash separator installation and their cooperative assembly will be considered. The combustor 4, is comprised of a main pressure sustaining body portion of casing 40, an inlet end 24, and an outlet end cap piece 42. The end cap piece is flanged at both ends, and is closed with a cap plate 43. The member 42 is essentially a continuation of casing 40, and is of the same diameter. The upper, louvered elbow section 18 of the U-shaped downcomer duct 16 is received in a suitable aperture in the wall of member 42, as shown, and is hermetically secured therein by welding, indicated generally at 44.

The subjoined plenum chamber casing 90, with its internal partitions, to be described more in detail hereinafter, serves as a pressure-sustaining housing for a battery of special reverse flow, flat-bottomed vortical whirl separators of the type described and claimed in our application Serial No. 257,702, hereinabove identified, and which we designate as the "Dunlap Tube." The special structural details of the novel vortical whirl separators of our said invention are shown herein in Figs. 1, 6, 7 and 8, and the description thereof will be repeated here, in view of the critical importance of these devices as integral parts and key members of the ash separating systems herein.

These devices, designated generally by the numeral 70 (Fig. 8), comprise primary separator or barrel sections 71 and adjacent bottomed discharge sections 72 provided with tangential blowdown lines 73, as shown. An axially apertured diaphragm 74 is mounted between the barrel and discharge sections of the separators. These diaphragms are provided further with marginal struck-up skimmer blades 75, extending into the barrel section and defining peripheral apertures establishing fluid communication between the said barrel and discharge sections, whereby centrifugally separated solids from the barrel section are delivered into the discharge section in spinning streams of motive fluid, and further separation of the solids then takes place with the eventual removal of the solids in a blowdown stream of motive fluid discharged through the tangential blowdown line 73. At the intake end of the barrel section there is provided peripheral vortical whirl imparting means for incoming dirty gas, and an axial cleaned gas outlet tube. In the form shown herein, a collar member 76 mounts peripheral vanes 77, severally set to give a discharge angle of substantially 30°. The outer edges of the vanes 77 are in frictional engagement with the inner surface of the cylindrical barrel section, and retain the collar 76 fixedly secured in the mouth of the barrel section of the separator. A cleaned gas discharge tube 78 is axially secured in the collar 76 and extends an appreciable distance on both sides thereof, so as to depend into the barrel section to place its mouth well below the downstream edges of the vanes 77. The output or discharge end of the tube can extend any desired distance, depending upon the particular installation. Wear resisting plugs 79 (Fig. 8) may be axially disposed in the bases of the discharge sections to prevent abrasion.

In the ash-separating system herein, the individual separators are made pressure-sustaining, whereby they can be mounted on the outside of the dirty gas plenum chamber casings, where they are readily available for inspection, removal and replacement, without requiring prolonged shutdown of the power plant and wholesale overhaul of the ash separating, concentrating and disposal system. The exposed separators are desirably lagged with suitable heat-insulating material, such as glass wool, which may be contained in demountable shields or housings mounted over the separators. The making of the barrel and discharge sections of the novel vortical whirl separators herein of heat-resisting stainless steel, in gauge thickness sufficient to render the devices pressure-sustaining, is a wholly novel idea, here presented for the first time, and is characterized by the fact that the initial fabrication and installation costs are but a minor fraction of the cost of the tank assembly illustrated in our parent application, and the maintenance and repair costs of the new installations are relatively small.

As noted above, one form of the improved ash separating and removal system is illustrated herein. In this system, a symmetrically disposed pair of combustors 4, 4', (Fig. 5), severally incorporate expansible secondary air inlets 24, 24', discharge sections 42, 42', having end cap plates 43, 43', (Fig. 4), and downcomers 16, 16'. The downcomers 16, 16', as shown, incorporate the structural details of the downcomer duct, illustrated in detail in Fig. 1, including, respectively, the bottom elbows 17, 17', and flanged discharge ends 15, 15'. The combustors 4, 4', severally incorporate capped ports 80, 80', mounting the combustive air-coal and circulating oil lines connected to the burners, not shown. Spaced clean-out ports 81, 81', and 82, 82', are symmetrically disposed in the combustor casings, and are readily available from the two sides of the dual installation. A pair of combination flanged equilibrator ducts and stay members 83, 84, connect the interiors of the combustors 4, 4', adjacent the ends thereof, as shown, and establish isobaric equilibrium between the secondary air plenum chambers of the two combustors. A pair of parallel motive fluid conduits 90, 90', (Figs. 4 and 5), are severally mounted in subjacent relation to the combustors 4, 4', and are provided with flanged inlet ducts 91, 91', and flanged outlet ducts 92, 92', severally hermetically coupled to downcomers 16, 16', and cleaned gas expansion delivery ducts 12a, 12a'. Access ports 93, 93', are severally provided in the conduits 90, 90', as shown. The conduits 90, 90', in the form shown, are cylindrical, and are severally divided, longitudinally (Fig. 6), in the direction of flow of the motive fluid, by diagonally sloping divider plates 94, 94', into mating cylindrical sections 95, 96, and 95', 96'. The plates 94, 94', are severally provided with upstream and riser sections 97, 97', hermetically secured to the inlet ducts 91, 91', and to the juxtaposed ends of the upper conduit segments 95, 95'. End closure plates 98, 98', are severally provided at the downstream ends of the divider plates, and are hermetically secured to the lower conduit segments 96, 96'. The upper and lower segments of the conduits, together with the interposed divider plates, and the end closures, are respectively hermetically secured to cooperating elements of the conduits by any suitable means, such as welding, designated generally by the numeral 99, and more particularly shown in Fig. 6.

It will be seen (Fig. 6), that the divider plates 94, 94', divide the casings into lower, dirty gas input plenum chambers, 100, 100', of progressively decreasing cross-section, and into upper cleaned gas output plenum chambers, 101, 101', of inversely proportional increasing cross-section. The dirty gas is stripped of its contained solids, and the cleaned gas is delivered in the following manner: The barrels 71, of vortical whirl separators 70 are positioned in and conformed to apertures 102 in the bottom of the input plenum chambers. These barrels desirably have the lips 71a, of the conformed mouth sections, peened over against the inner surfaces of the plenum chambers, and conformed thereto, and they are hermetically sealed in place by welding, as indicated generally at 103 (Fig. 6). As indicated hereinabove, the discharge ends of cleaned gas delivery tubes 78 are positioned in suitable apertures in the divider plates 94, 94', and are hermetically secured therein in any suitable manner, as by welding, indicated generally at 104, (Fig. 6).

The separated ash blowdown system of the motive fluid generator illustrated in Figs. 1–6, will now be described: As shown more particularly in Figs. 4–6, the ash separator conduits or plenum chamber casings 90, 90', are severally provided with parallel rows of staggered, depending vortical whirl separators 70. The ash blowdown lines 73 from the individual separators debouch into ash discharge manifolds, a manifold being provided for each row of separators. Referring to the sectional showing of Fig. 7, the manifolds for the rows of separators of unit 90, are designated 110, 111, while those for unit 90', are designated 112, 113. Manifolds 110, 111, jointly discharge into a take-off duct 114, while manifolds 112, 13 jointly discharge into take-off duct 115. The ducts 114, 115 are severally coupled to converging ducts 116, 117, which, in turn, are severally coupled to opposed tangential inlets 118, 119, of a small capacity vortical whirl ash concentrator 120, having a cleaned gas discharge tube 121, and a concentrated ash blowdown line 122. To cool the ash blowdown streams, the manifolds may be severally provided with cooled air line connections 32, as shown in Fig. 1, or, as shown in Fig. 2, a fan or blower 125 may be coupled to the upstream end of a sheath 127, which may encase manifold 126. This member, as noted hereinabove, may also be provided with radially disposed extended surfaces or fins 128 exposed to the ambient air, or encased in sheath 127 (Fig. 3), and cooling air blown through the radial passages formed by and between the sheath and the longitudinal fins.

The combustors and ash separators herein, and as shown more in detail in Figs. 4 and 5, can be mounted in locomotive cabs 130 having roofs 131, side walls 132, flooring 133, floor-supporting I-beams 134, and vertically disposed framing members 135 serving for the conjoint support of the side walls and superjacent roof structure.

There have been described and illustrated ash separating and cooling systems for use with combustors adapted for the pressurized combustion of powdered coal capable of performing and effecting all of the specifically mentioned features of novelty and advantage of the invention, as well as others which are apparent to those skilled in the art. Various uses of the present invention may be made using the described structures. Accordingly, it is apparent that variations as to operation, size and shape, and rearrangement of the elements may be made without departing from the spirit of the invention. Therefore, limitation is sought only in accordance with the scope of the following claims.

We claim:

1. In a gas turbine power plant of the character described, in which pulverized coal is carried and burned in a pressurized stream of primary air, and the gaseous products of combustion are diluted and cooled with secondary air to optimum turbine operating temperature to form an ash- and combustion residue-bearing gaseous motive fluid source, the improved ash and combustion residue separating means, comprising a horizontally disposed tubular casing having a cleaned gas outlet, said casing mounting an internal, diagonally disposed separator plate dividing the casing into juxtaposed lower input and upper output plenum chambers, the lower plenum chamber being of progressively decreasing, arcuately segmented cross-section in the direction of flow of the incoming dirty gas, and the upper plenum chamber being of proportionately increasing arcuately segmented cross-section in the direction of flow of the outgoing cleaned gas; a plurality of vertically disposed, self-supporting, pressure-sustaining vortical whirl separators subjoined to the bottom of the casing and having their intake ends hermetically secured thereto and therein, each said separator including a barrel section in fluid communication with the input plenum chamber, and a coaxial, juxtaposed, bottomed ash discharge section; a cleaned gas discharge tube and circumjacent vortical whirl-imparting inlet means for each separator, each said tube being hermetically secured at its discharge end in said diagonal separator plate, and severally discharging into said cleaned gas output plenum chamber; and a tangential blowdown line for separated ash at the end of each of the discharge sections, the blowdown streams of separated ash discharging into a manifold, said manifold incorporating cooling means effective to quench hot solids contained in the blowdown streams.

2. An ash separator according to claim 1, characterized by the fact that the ash discharge manifold is provided with means for introducing a cooling gas therein.

3. An ash separator according to claim 1, characterized by the fact that the ash-discharge manifold is provided with extended surfaces, said extended surfaces being radially disposed and encased in a sheath, and means is provided to force cooling air through the sheath.

References Cited in the file of this patent

UNITED STATES PATENTS

| | | |
|---|---|---|
| 2,138,143 | Dodge | Nov. 29, 1938 |
| 2,368,263 | Schneible | Jan. 30, 1945 |
| 2,433,774 | Madely | Dec. 30, 1947 |
| 2,583,920 | Yellott | Jan. 29, 1952 |
| 2,583,921 | Yellott | Jan. 29, 1952 |
| 2,601,390 | Hague | June 24, 1952 |
| 2,650,675 | Yellott | Sept. 1, 1953 |
| 2,703,921 | Brown | Mar. 15, 1955 |
| 2,771,962 | Yellott et al. | Nov. 27, 1956 |
| 2,773,598 | Castellani | Dec. 11, 1956 |

FOREIGN PATENTS

| | | |
|---|---|---|
| 58,218 | Austria | Mar. 26, 1913 |
| 1,006,499 | France | Jan. 23, 1952 |
| 905,446 | Germany | Mar. 1, 1954 |